US012691969B2

(12) United States Patent　　(10) Patent No.:　US 12,691,969 B2

Ackermann et al.　　(45) Date of Patent:　　Jul. 28, 2026

(54) MEANS OF TRANSPORT THAT CAN BE SIMULTANEOUSLY DRIVEN ELECTROMOTIVELY AND BY HUMAN MUSCULAR POWER

(71) Applicant: KILLWATT GMBH, Tirschenreuth (DE)

(72) Inventors: Hans Peter Ackermann, Tirschenreuth (DE); Volker Ackermann, Tirschenreuth (DE)

(73) Assignee: KILL WATT GMBH, Tirschenreuth (DE)

( * ) Notice: Subject to any disclaimer, the term of this patent is extended or adjusted under 35 U.S.C. 154(b) by 700 days.

(21) Appl. No.: 18/031,636

(22) PCT Filed: Sep. 24, 2021

(86) PCT No.: PCT/EP2021/076355

§ 371 (c)(1),
(2) Date: Nov. 13, 2023

(87) PCT Pub. No.: WO2022/078731

PCT Pub. Date: Apr. 21, 2022

(65) Prior Publication Data

US 2024/0101219 A1　　Mar. 28, 2024

(30) Foreign Application Priority Data

Oct. 13, 2020　(DE) ..................... 10 2020 212 908.8

(51) Int. Cl.
　B62M 6/55　　　(2010.01)
　F16H 49/00　　　(2006.01)

(52) U.S. Cl.
　CPC ............. B62M 6/55 (2013.01); *F16H 49/001* (2013.01)

(58) Field of Classification Search
　CPC ....................................................... B62M 6/55
　See application file for complete search history.

(56) References Cited

U.S. PATENT DOCUMENTS

| | | | |
|---|---|---|---|
| 2,943,508 A | 7/1960 | Musser | |
| 9,140,342 B2 * | 9/2015 | Hoebel | ................. F16H 49/001 |
| 10,343,746 B2 * | 7/2019 | Doerndorfer | ........... B62M 6/50 |
| 10,371,240 B2 * | 8/2019 | Rossberger | ........... F16H 49/001 |

(Continued)

FOREIGN PATENT DOCUMENTS

| | | |
|---|---|---|
| CN | 102069888 | 5/2011 |
| CN | 103129691 | 6/2013 |

(Continued)

OTHER PUBLICATIONS

English translation of International Search Report from corresponding PCT Appln. No. PCT/EP2021/076355, dated Dec. 14, 2021.

(Continued)

*Primary Examiner* — Kevin Hurley
(74) *Attorney, Agent, or Firm* — Secant IP, PLLC

(57) ABSTRACT

A means of transport, in particular a pedelec, which can be driven by means of drive energy produced electromotively and by human muscular power, comprising a drive unit in which an electric drive motor and a harmonic drive transmission are nested one inside the other, thereby saving space.

16 Claims, 4 Drawing Sheets

(56) References Cited

U.S. PATENT DOCUMENTS

| | | | | |
|---|---|---|---|---|
| 11,945,547 B2 * | 4/2024 | Edwards | .............. | F16H 49/001 |
| 2004/0055404 A1 | 3/2004 | Mills et al. | | |
| 2017/0259883 A1 | 9/2017 | Yamamoto | | |
| 2018/0015985 A1 | 1/2018 | Doerndorfer | | |
| 2022/0081063 A1 | 3/2022 | Mercat et al. | | |

FOREIGN PATENT DOCUMENTS

| | | | | |
|---|---|---|---|---|
| CN | 203332337 | 12/2013 | | |
| CN | 204688340 | 10/2015 | | |
| DE | 1135259 | 8/1962 | | |
| DE | 102013211431 | 12/2014 | | |
| DE | 102013211437 | 12/2014 | | |
| DE | 102014106212 | 11/2015 | | |
| DE | 102015203534 | 9/2016 | | |
| DE | 102016226251 | 6/2018 | | |
| DE | 102017122949 | 4/2019 | | |
| DE | 102017219608 | 5/2019 | | |
| DE | 102020130619 A1 * | 5/2022 | ............ | B62M 23/00 |
| EP | 0093888 | 11/1983 | | |
| EP | 3247026 | 11/2017 | | |
| EP | 3247619 | 3/2020 | | |
| EP | 3822154 | 5/2021 | | |
| FR | 2816386 | 5/2002 | | |
| WO | 2020/079498 | 4/2020 | | |
| WO | 2020/144419 | 7/2020 | | |
| WO | 2021/190843 | 9/2021 | | |

OTHER PUBLICATIONS

Official Journal of the European Union, "Correction of the ordinance of the European Parliament and of the Council on the approval and market surveillance of two or three-wheel vehicles and quadricycles", (L 60 of Mar. 2, 2013), pp. 65-69, dated Mar. 23, 2016.

Official Journal of the European Union, Adjustments to the Directive of the European Parliament and of the Council of May 15, 2014 on markets in financial instruments and amending the Directives 2002/92EG and 2011/61/EU, dated Mar. 10, 2017, p. 116. No English available.

Official Journal of the European Union, "Acts Adopted by Bodies Created by International Agreements", Regulation 17, dated Oct. 18, 2019, pp. 1-30.

Official Journal of the European Union, Regulation No. 168/2013 of the European Parliment and of the Council of Jan. 15, 2013 on the approval and market surveillance of a two- or three-wheel vehicles and quadricycles, dated Mar. 2, 2013, pp. 52-128.

English translation of Opposition to related European Application No. 21783470.4 (EP4 229 317), dated May 6, 2025.

* cited by examiner

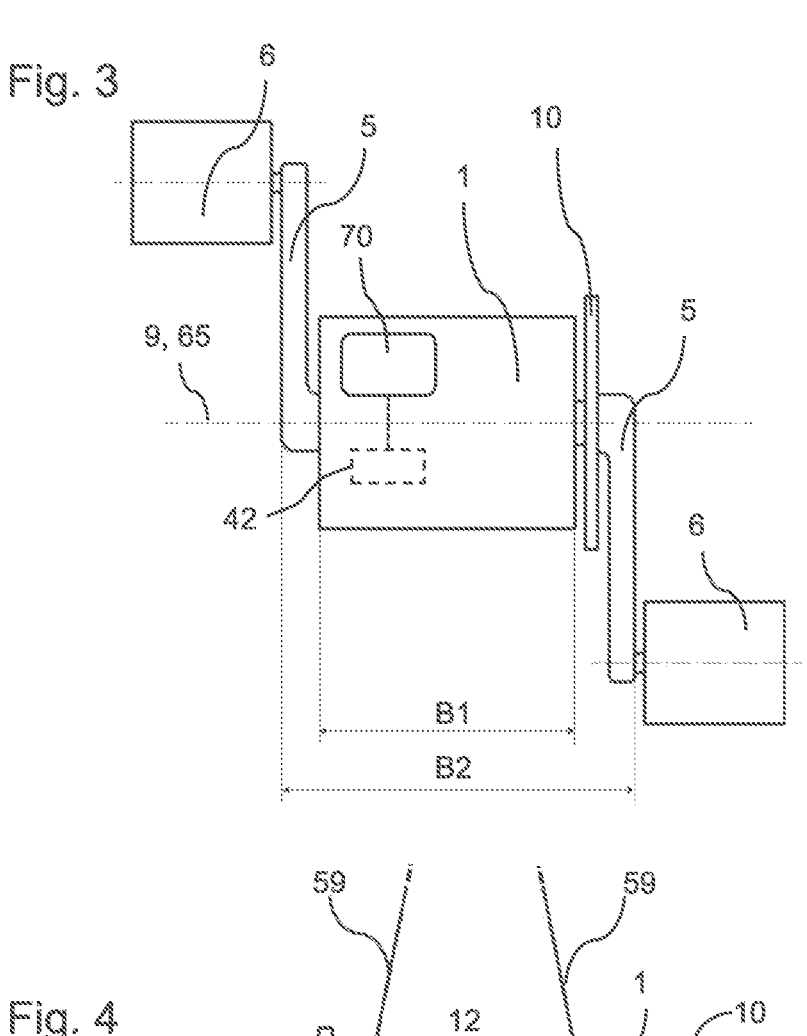

MEANS OF TRANSPORT THAT CAN BE SIMULTANEOUSLY DRIVEN ELECTROMOTIVELY AND BY HUMAN MUSCULAR POWER

FIELD

The invention relates to a means of transport that can be simultaneously driven electromotively and by human muscular power, in particular a pedelec.

BACKGROUND

Generic means of locomotion include, for example, single- or multi-track vehicles such as bicycles, in particular electric bicycles, e-bikes or pedelecs, but also water bicycles, pedal boats or wheelchairs. In particular, generic means of locomotion include vehicles of vehicle categories L1e, L2e, L3e, L4e, L5e, L6e and L7e according to Article 4 of EU Regulation 2013/168/EU of Jan. 15, 2013. Further, they include in particular vehicles designed for a maximum speed of up to 6 km/h, vehicles intended exclusively for use by physically disabled persons, such as wheelchairs, vehicles intended exclusively for use in sporting competition, pedal-driven bicycles with pedal assistance, which are equipped with an electric motor-based auxiliary drive with a maximum continuous rated power of up to 250 W, the assistance of which is interrupted when the rider stops pedaling and the assistance of which progressively decreases as the vehicle speed increases and is interrupted before the speed of the vehicle reaches 25 km/h, self-balancing vehicles with electric motor-based propulsion, pedal-propelled sports vehicles, pedal-propelled vehicles that do not have at least one seat, and pedal-propelled vehicles with an R-point (according to ECE-R 17)≤400 mm. They frequently have a front wheel and at least one rear wheel connected by a frame. However, there may also be multiple rear wheels, for example two rear wheels, and/or multiple front wheels, for example two front wheels, and in particular any combination thereof. These wheels may, for example, be arranged side by side transversely to a forward direction of travel, such as on a wheelchair, a tricycle, or a vehicle with a sidecar, or one behind the other in a forward direction of travel, such as on a tandem. Such means of transport are increasingly equipped with a drive unit having at least one electric motor to assist the user in propelling the means of transport. Typically, they are not powered by this electric motor alone, but the electric motor assists the user in propelling the means of transport through his own human muscle power. The electric motor is controlled by a control unit, for example, so that the degree of assistance is in most cases selectable. In this way, a user can apply exactly as much of his own power as he can or wants to during a trip with such a means of transport, while still moving at a comfortable speed usable in everyday life.

A problem with the existing drive units is their size, especially transversely to the longitudinal axis of the means of transport. The drive unit is typically arranged at or near a wheel hub or at or near a drive bearing, such as a bottom bracket. Firstly, the drive unit should not protrude too far beyond the wheel on either side. Secondly, when arranging them at the bottom bracket, it should be noted that, for example, the crank arms of the pedals of a bicycle should typically maintain a maximum axial distance of 140-180 mm from each other due to the human anatomy. Since the drive unit is likewise located between the crank arms, it is obvious that it should be designed as narrow as possible to enable the rider to drive comfortably even over long distances. However, this entails a number of design problems as rotary bearings and freewheels required in the drive units each require a certain amount of space. Typically, the gearings and the electric motors likewise occupy a non-negligible amount of installation space in the drive units, especially in the direction of the rotation axis of, for example, the bottom bracket or the rear wheel, which increases the overall width of the drive units beyond the desired extent.

SUMMARY

It is therefore the object of the present invention to provide a generic means of transport having a drive unit which is as narrow as possible, in particular transversely to the direction of travel of the means of transport. At the same time, the drive unit should be controllable in a flexible manner and be able to cover the entire range of functions of modern drive units.

The object is achieved with a means of transport according to the independent claim. Preferred embodiments are cited in the dependent claims.

The drive unit according to the invention comprises an input shaft for transmitting drive energy generated or provided through human muscle power. The input shaft may thus be, for example, the crankshaft of a bicycle or be connected to the crankshaft in a co-rotating manner. Alternatively, the input shaft may also be connected to a gear-wheel of a traction means, such as the chainring, in a co-rotating manner. The input shaft is thus arranged such that it can be set in rotation by an operator or rider of the means of transport through human muscle power, for example by pedaling on the bicycle. This can be done directly or indirectly. In particular, this should take place parallel to an electric motor in the direction of force flow from the point of introduction of human muscular power into the entire drive train.

The drive unit according to the invention further comprises an output shaft for delivering drive energy to a travel unit. The travel unit is, for example, at least one wheel (or a propeller in the case of means of transport in water) which is set in rotation by the drive energy transmitted by the output shaft, causing the means of transport to move. Alternatively, the output shaft may be connected to a gear-wheel of a traction means, such as the chainring, in a co-rotating manner. Alternatively, the output shaft may also be configured for co-rotation with a hub housing, which transmits the rotational movement, for example via spokes, to a travel unit. The output shaft transmits its rotation to the travel unit of the means of transport, which is why the drive unit is configured to apply a rotation to the output shaft that corresponds to a desired travel speed of the means of transport. In the direction of force flow from the point of introduction of human muscle power, the output shaft is thus functionally arranged between the input shaft and the travel unit driven by the drive unit.

Accordingly, the drive unit is configured to transfer the drive energy from the input shaft to the output shaft. At the same time, however, it is also envisaged that the drive unit is configured such that it can adapt the speed and torque transmitted to the output shaft to current requirements of the operating situation. For this purpose, the drive unit comprises a harmonic drive transmission arranged around a rotation axis with a wave generator, a flexspline and a ring gear. The axis of rotation may be, for example, the pedaling axis of a bottom bracket or the wheel axis of a travel unit, in particular a travel unit driven by the drive unit. A harmonic or strain wave transmission is a type of gearing that is particularly suitable for the purpose at hand due to its simple and narrow configuration as well as its robustness and high reduction ratio. Harmonic transmissions per se have been described in the prior art and are known to the skilled person, for example from DE 1 135 259 B. They can, for example, translate high speeds with low torques of the wave generator into low speeds with high torques of the flexspline and/or the ring gear and vice versa. Moreover, the drive unit comprises an electric drive motor arranged around the rotation axis and having a stator and a rotor, wherein drive energy of the electric drive motor can be transmitted to the output shaft via the harmonic drive transmission. The electric drive motor can therefore be used to assist the rider or the rider's human muscle power to transfer drive energy provided by the electric motor to the output shaft and thus contribute to the locomotion of the means of transport. Due to the comparatively high reduction ratio of the harmonic transmission, the high speeds and low torques of the electric motor can be converted into low speeds with high torques, which can be used to drive the means of locomotion. For this purpose, the electric drive motor is preferably in operative drive connection with the wave generator of the harmonic drive gearing. In other words, the rotor of the electric drive motor is preferably connected to the wave generator in a co-rotating manner, or is even integrally formed with it. In the present case, the output of the harmonic drive gearing is preferably formed by the ring gear. In particular, the ring gear is connected to the output shaft of the drive unit in a co-rotating manner. The drive unit of the present invention is also preferably characterized by having only one electric motor, more specifically the electric drive motor. Thus, in this embodiment, no further electric motors are provided in the drive unit and in particular not on the entire means of transport. Moreover, the drive unit preferably has only one harmonic transmission, more specifically the harmonic drive transmission. Accordingly, in this case, no further harmonic transmissions are provided in the drive unit or, preferably, on the entire means of locomotion.

According to the invention, the flexspline is formed as a sleeve extending in the direction of the rotation axis. The sleeve is connected on one axial side to a rotary bearing which rotatably supports the sleeve, for example, relative to a stationary or static housing. Toward the other axial side, the sleeve has an engagement region for the wave generator and in particular also the external toothing for the ring gear. A sleeve cavity is located between the rotary bearing and the wave generator as seen in the direction of the rotation axis. The sleeve cavity thus describes a volume enclosed by the flexspline and in particular the sleeve, especially as seen from the rotation axis in radial direction. The configuration of the flexspline with sleeve as a flexspline cup is helpful with respect to its bending and twisting properties and thus faultless operation of the harmonic transmission. However, according to the invention, the sleeve cavity is used to save installation space in a very effective manner. It is therefore envisaged that the electric drive motor is arranged at least partially, preferably completely, in the sleeve cavity of the harmonic transmission in an axial direction of the rotation axis. In other words, for example, the electric drive motor may be arranged at least partially, preferably completely, in the sleeve cavity of the harmonic drive transmission in an axial direction of the rotation axis. The electric drive motor is thus preferably at least partially and preferably completely enclosed in radial direction by the sleeve of the flexspline. The specification regarding the electric drive motor refers in particular to the axial extent of the rotor and/or stator along the rotation axis. According to a preferred embodiment, the electric drive motor is therefore surrounded by the sleeve of the flexspline in radial direction of the rotation axis over the entire axial extent of its rotor and/or stator. In this way, the sleeve cavity is structurally used to accommodate the electric motor, which saves installation space.

The input shaft is preferably connected in a co-rotating manner (for example via a freewheel, which will be explained in more detail below) to a slowly rotating transmission part of the harmonic drive transmission, for example the flexspline or the ring gear. In particular, the input shaft is connected to the transmission output of the harmonic drive transmission in a co-rotating manner. Preferably, the input shaft is connected to the ring gear of the harmonic drive transmission or directly to the output shaft in a co-rotating manner, and thus introduces or feeds the drive energy provided through human muscle power into the drive train via the ring gear or the output shaft. Since the input shaft is connected to the output shaft in a co-rotating manner, either directly or indirectly via the ring gear, a speed of the input shaft can be transmitted one-to-one to the output shaft.

Using the ring gear as a transmission output as described above is another constructional approach to keep the axial extent of the drive unit as small as possible. Generally, it is helpful for any drive system with a harmonic transmission in order to save axial installation space, for example regardless of the type of transmission used, as long as it works with a ring gear, and the configuration of the motor. Therefore, this aspect, in addition to embodiments of the concept specifically described in this application, constitutes a separate and distinct invention that is independent of the structural and functional features of the exemplary embodiments described herein and could be claimed separately.

The electric drive motor is preferably a synchronous motor, in particular a three-phase synchronous motor, preferably with an external rotor. In the embodiment described by the invention, it is characterized by particularly narrow dimensions.

Another preferred embodiment of the invention likewise relates to an arrangement of the electric drive motor that saves as much space as possible. For this, it is preferred that the wave generator, the flexspline and the ring gear of the harmonic drive transmission are arranged overlapping one another in a gearing plane perpendicular to the rotation axis. The wave generator, the flexspline and the ring gear of the harmonic drive transmission are thus arranged in succession in radial direction of the rotation axis, in particular in the mentioned order from the inside to the outside and/or in alignment in radial direction. In addition, the flexspline, in particular the sleeve of the flexspline, is mounted for rotation relative to a counter bearing in a bearing plane perpendicular to the rotation axis. In the context of the present application, the counter bearing refers, for example, to a stationary or static part of the drive unit and is, for example, stationary together with a housing or housing part. Preferably, the electric drive motor is arranged at least partially and preferably completely between the gearing plane and the bearing plane. This also refers in particular to the axial extent of the rotor and/or stator of the electric drive motor along the rotation axis.

For the electric drive motor of the drive unit according to the invention to be controllable particularly precisely, in particular by a control unit explained in more detail below, it is preferred that at least one, in particular contactless, speed and/or rotation angle sensor, in particular a Hall sensor, is provided at the electric drive motor. Moreover, to accommodate the corresponding sensors in the drive unit in the most space-saving manner possible, additionally or alternatively, the at least one, in particular contactless, speed and/or rotation angle sensor is arranged in particular in the sleeve cavity of the flexspline. The sensor is therefore preferably likewise surrounded by the sleeve of the flexspline in radial direction of the rotation axis. Moreover, the sensor is preferably likewise located between the gearing plane and the bearing plane.

Due to the large number of components of the drive unit that can be rotated relative to one another and the rotatability of various components relative to the fixed housing, a large number of rotary bearings, for example (grooved) ball bearings, are necessary in order to arrange these components so that they can rotate relative to one another, in particular about the rotation axis. The arrangement is preferably such that these elements, which are rotatable relative to one another, can all be rotated about a common rotation axis, in particular the bottom bracket axis or the rotation axis of a travel unit. The challenge in the actual structural implementation is that these rotary bearings, in order to be able to fulfill their respective function, naturally have a minimum width, which, especially when accumulated over many rotary bearings in the axial direction, contribute significantly to the overall width of the drive unit. The invention therefore also provides for saving installation space in the axial direction of the rotation axis by intelligent arrangement of the rotary bearings. For example, it is preferred that a rotary bearing for the output shaft and a rotary bearing for the input shaft are arranged in a common shaft bearing plane perpendicular to the rotation axis. These two rotary bearings are thus preferably arranged one above the other or overlapping each other in radial direction relative to the rotation axis. It is particularly preferred that the two rotary bearings are configured as ball bearings with a same axial extent along the rotation axis and overlap completely in radial direction of the rotation axis. The two rotary bearings are therefore arranged next to each other not in the axial direction but in radial direction, so that the width of one of the rotary bearings along the rotation axis is saved. This arrangement of the rotary bearings for the output shaft and for the input shaft is generally useful for any drive system to save axial installation space, for example regardless of the gearing types used and the configuration of the motors. Therefore, this aspect, in addition to embodiments of the concept specifically described in this application, constitutes a separate and distinct invention that is independent of the structural and functional features of the exemplary embodiments described herein and could be claimed separately.

In order to limit the axial width or extent of the drive unit, it is known, for example, to arrange multiple gearing s or multiple motors next to each other not in axial direction but in radial direction with respect to the rotation axis. In other words, in order to limit the extent of the drive unit transverse to the direction of travel of the means of transport, an extent in the direction of travel or in vertical direction was accepted. However, the aim of the present invention is to avoid such an increased size of the drive unit in the direction of travel and/or in vertical direction. It is therefore preferred that the electric drive motor and the harmonic drive gearing are arranged coaxially to each other around the rotation axis. Accordingly, they in particular have the same rotation axis. Such an arrangement is not only particularly compact, but also has advantages in terms of force flow through the drive train.

As already explained, according to the invention, the ring gear of the harmonic drive transmission is used as the gearing output or output. The drive energy provided through human muscular power can therefore be introduced either via the ring gear or the output shaft. Preferably, the input shaft is connected to the ring gear or the output shaft in a co-rotating manner in at least one direction of rotation, and the energy provided through human muscle power is thereby introduced into the drive train. For this, the input shaft is preferably connected to the ring gear of the harmonic drive gearing or the output shaft via a freewheel, wherein the freewheel locks or establishes a co-rotating connection in particular in a forward direction of rotation or forward direction of travel of the input shaft and thereby transmits the corresponding rotational movement to the ring gear and/or the output shaft via the freewheel. The freewheel also makes it possible, for example, to pedal backwards freely, or for the output shaft to be rotated faster by the electric drive motor than the input shaft rotated by a rider.

A further freewheel is preferably arranged on the flexspline of the harmonic drive transmission. In particular, the flexspline of the harmonic drive transmission is mounted on a stationary housing part via a freewheel. This freewheel rotates freely in particular when the flexspline rotates in the forward direction of travel, and blocks in particular when the flexspline would rotate against the forward direction of travel. When the means of transport moves forward, the output shaft and the ring gear rotate forward. As a result, the flexspline of the harmonic drive transmission is likewise rotated forward by its meshing with the ring gear. Since the freewheel rotates freely in this direction of rotation, the rotor of the electric drive motor does not have to be dragged along. Therefore, if the means of transport is driven without assistance by the electric drive motor, for example through pure human muscle power, this can be done with low pedal resistance. If, on the other hand, the electric drive motor is operated to transmit a supporting torque to the ring gear and thus the output shaft, the flexspline is supported on the stationary housing via the freewheel so that the drive energy is transmitted from the electric drive motor via the wave generator and the flexspline to the ring gear and thus the output shaft.

As already described, the freewheel is preferably arranged on the flexspline of the harmonic drive transmission such that it freewheels when the means of transport is moving forward and the electric drive motor is applying no or only a small amount of drive energy. In these situations, it may be desirable to operate the electric drive motor as a generator to recuperate kinetic energy. To achieve this, the freewheel is preferably switchable between a switching position that freewheels in one direction of rotation and a switching position that engages, i.e., does not freewheel, in this direction of rotation. In this direction of rotation, the freewheel thus acts as a switchable clutch, in other words. Alternatively, a separate clutch unit may be provided which can establish a co-rotating connection between the freewheel and a stationary housing part, which also bypasses the freewheel and achieves the same result. In this way, it is possible for the electric drive motor to be operated as a generator that takes drive energy from the ring gear and converts it into electrical energy. If the freewheel is switched to its non-freewheeling position, this means that it also establishes a co-rotating connection between the flexspline and a stationary housing part in the forward direction of rotation. This blocks the flexspline and prevents it from rotating. In this way, drive energy is transferred from the ring gear to the wave generator and thus to the electric drive motor, which then acts as a generator and converts this drive energy into electrical energy, for example to charge a storage device for electrical energy. In this way, the means of transport can in particular be decelerated with recovery of electrical energy. This use of a switchable freewheel and/or a separate clutch unit to operate the electric drive motor as a generator can generally be implemented with any drive system, for example regardless of the type of gearing used and the configuration of the motor. Therefore, this aspect, in addition to embodiments of the concept specifically described in this application, constitutes a separate and distinct invention that is independent of the structural and functional features of the exemplary embodiments described herein and could be claimed separately.

As already explained above for the rotary bearings, the freewheels also have a minimum necessary axial extent along the rotation axis. It is therefore also advantageous to arrange the freewheels with at least one rotary bearing radially overlapping with respect to the rotation axis in order to reduce their common axial extent overall. It is therefore preferred that a rotary bearing between a counter bearing and the flexspline of the harmonic drive transmission is arranged so as to overlap with a freewheel in a bearing plane perpendicular to the rotation axis. In particular, it is preferred that the rotary bearings and the freewheels overlap at least half, relative to their respective axial extent along the rotation axis, preferably at least two-thirds and most preferably completely. The counter bearing is a stationary part, i.e., it does not co-rotate with the drive unit, and is connected, for example, to other stationary housing parts of the drive unit in a non-rotating manner.

A further saving of axial width of the drive unit is achieved by preferably arranging a rotary bearing in a plane perpendicular to the rotation axis together with a harmonic drive transmission. The rotary bearing thus overlaps with the harmonic drive transmission in radial direction of the rotation axis. For example, it may be the rotary bearing of the rotor of the electric drive motor. Such a rotary bearing is necessary anyway and must therefore be placed in a space-saving manner. According to a preferred embodiment of the invention, the wave generator, the flexspline and the ring gear of the harmonic drive transmission are therefore arranged in a gearing plane perpendicular to the rotation axis together with a rotary bearing for the rotor of the electric drive motor, in particular with respect to a counter bearing. In this embodiment, the rotary bearing of the rotor of the electric drive motor is thus displaced into the harmonic drive transmission and, in particular, nested with it. Particularly preferably, the corresponding rotary bearing has an axial extent that corresponds to the axial extent of further components of the harmonic gearing, for example the wave generator or the rotary bearing, in particular ball bearing, between the wave generator and the flexspline. Preferably, the rotary bearing overlaps these elements completely, as seen in radial direction and in relation to the axial extent.

A number of planes oriented perpendicular to the rotation axis have already been described above, in each of which various components of the drive unit are arranged in radial overlap to reduce an axial extension of the drive unit along the rotation axis. Another such plane is the electronics bearing plane, which is likewise perpendicular to the rotation axis and in which a rotary bearing, in particular a ball bearing, and a control unit are arranged. For example, the rotary bearing is arranged between the stationary housing and the crankshaft if the drive unit is arranged around the crankshaft, or the rotary bearing is arranged between a stationary housing portion, such as an axle body, and the rotating hub housing if the drive unit is arranged on a wheel hub. The electronic control unit will be discussed in more detail below. With regard to an optimum arrangement of the components of the drive unit relative to one another, it is preferred that, in the direction along the rotation axis, the shaft bearing plane, the gearing plane of the harmonic drive transmission, the bearing plane of the flexspline of the harmonic drive gearing and, in particular, also the electronics bearing plane are arranged in succession. This results in a particularly space-saving arrangement of the respective components.

As already indicated above, in the case of a bicycle, the drive unit may, for example, be located at the center of the frame in the region of the pedals or also at one of the wheel hubs. In a preferred embodiment, the drive unit is configured as a center drive unit, wherein in particular the rotation axis is arranged coaxially with a pedaling axis. The drive unit is arranged, for example, between the pedals and in particular between the pedal cranks. In this arrangement, the drive unit is passed through by a rotating axle, in particular the crankshaft, and has a stationary housing. In a preferred alternative, the drive unit is configured as a hub drive unit, wherein in particular the rotation axis is arranged coaxially with a wheel axis. The drive unit is therefore arranged at a wheel hub, for example at the rear wheel. In this case, the drive unit is passed through by a stationary axle body and has a rotating hub housing which transfers the rotational movement to the wheel via spokes. The drive unit is particularly preferably configured as a center drive unit, since the central position on the frame of a bicycle, for example, achieves a particularly good weight distribution with a low center of gravity arranged centrally along the longitudinal axis.

It is always advantageous to configure the axial extent of the drive unit as small as possible. In fact, this is of particular advantage when the drive unit is configured as a center drive unit, i.e., in the region of the bottom bracket axis. As mentioned at the beginning, based on average human anatomy, the aim is for the crank arms of the vehicle's pedals to be ideally 140-180 mm apart. This objective can be met with the measures described above. Depending on how consistently the measures are implemented, even tighter dimensions can be achieved. For example, it is preferred that the maximum extent of the drive unit along the rotation axis is not more than 100 mm, preferably not more than 85 mm, more preferably not more than 70 mm and in particular, for example, not more than 60 mm. The crank arms of the pedals, on the other hand, should preferably be spaced apart by not more than 150 mm, more preferably by not more than 130 mm, and most preferably by not more than 110 mm. In this way, comfortable and anatomically correct pedaling can be made possible even when the drive unit is configured as a center drive unit.

In a preferred embodiment, a control unit is provided for controlling the electric drive motor. The electronic control unit controls in particular the speed and/or the direction of rotation and/or the torque of the electric motor. For example, the control unit controls the electric motor via a stored rotating field, for example a three-phase rotating field. In such rotating fields, both the speed and torque behavior of the motor are stored. The corresponding control of the electric motor is known in the prior art and is known to the skilled person, so that it will not be discussed in more detail here. The control unit may have a variety of different features and functions, as explained below.

In purely structural terms, the control unit is integrated into the drive unit. It is located in the electronics bearing plane already described, which is perpendicular to the rotation axis, for example together with a rotary bearing for a crankshaft. It is therefore not simply attached to the outside of the drive unit, but is nested with the gearing parts of the drive unit, which contributes to efficient use of the installation space.

To control the functions of the drive unit, it is necessary to determine various variables that reflect the current operating state and that the control unit takes into account when controlling the electric motor. For example, the control unit is connected to a rotation angle and/or speed and/or torque sensor at the input shaft. The input shaft is driven by the rider during operation, for example by pedaling, so that the corresponding variables can be used by the control unit, for example to infer the intentions of the rider, who will pedal more when he wants to accelerate, for example. In addition, the control unit is preferably connected to a travel speed sensor, which is arranged in particular in or on the hub of the rear wheel, on the rear wheel or its spokes, or on the brake disc, and which determines the overall travel speed of the means of transport. According to a preferred embodiment, the travel speed sensor is integrated into the drive unit and arranged together with it on the means of transport. In this case, the travel speed is determined at the output shaft, for example. This is particularly possible if the driven wheel of the means of transport, for example the rear wheel, does not have its own freewheel and the traction means gearwheel or the chain wheel on the drive unit is always rotated by the traction means at the speed of the driven wheel. Via the travel speed sensor, the control unit can, for example, check whether the travel speed is above or below a maximum speed above which, for example, no more assistance may be transmitted from the electric motors to the output shaft. The control unit then takes over the corresponding control of the electric motor and also its shutdown when a maximum speed, for example as specified by law, is exceeded. Furthermore, the control unit is preferably connected to a speed and/or rotation angle sensor, in particular a Hall sensor, at the electric drive motor. Preferably, the control unit is also connected to an amperemeter for the electric drive motor. The amperage can be used by the control unit to infer the torque of the electric motor. Together with the speed, the control unit can use this to calculate the power of the electric motor and regulate it accordingly.

A main function of the control unit is preferably to control the speeds and torques of the electric drive motor such that the summed drive energy or drive power including the energy or power provided through human muscle power at the output shaft corresponds to the energy or power requirement of the drive unit. The corresponding energy or power requirement is determined by the control unit based on the available measurement signals, for example taking into account the pedaling behavior of the rider, from which an intention to accelerate can be inferred, for example. The degree of electric motor-based assistance for the rider can be set at the control unit, for example, and is taken into account by the latter. Preferably, the control unit controls, for example, the speed of the electric drive motor in proportion to the travel speed. In this way, the electric drive motor always takes over the same proportion of the necessary drive energy or drive power at all travel speeds. Moreover, it is preferred that the control unit activates a drive support function or a brake function depending on the direction of rotation of a shaft driven by human muscular power, for example the crankshaft or the input shaft. In this way, the drive unit implements a coaster brake, for example, by deriving a braking command from a backward pedaling action by the rider. In this situation, the control unit activates, for example, the switchable freewheel already described and operates the electric drive motor as a generator for recuperating kinetic energy into electrical energy, which brakes the means of transport.

Pedelecs with rear suspension have an effect called pedal kickback. This term describes the phenomenon that every compression of the suspension automatically causes a rotation of the traction means gearwheel, for example the chainring. This also rotates the crankshaft and crank arms along with the pedals, which is perceived as uncomfortable by a rider. The control unit is now preferably configured to partially and in particular completely compensate for the pedal kickback caused by the compression of the suspension of the means of transport by controlling the electric drive motor. For this purpose, the control unit is connected to a suspension travel sensor of the means of transport, which in particular determines the compression itself and its degree and forwards them to the control unit. By controlling the electric drive motor, the control unit can cause the crankshaft and thus also the pedals to rotate. Based on the determined suspension travel, the control unit is now configured to control the electric drive motor such that it counteracts the movement of the crankshaft caused by the pedal kickback. As a result, there is no rotation of the pedals despite the compression at the rear wheel. This compensation of the pedal kickback can generally be implemented with any drive system that can influence the position of the pedals. Therefore, this aspect, in addition to embodiments of the concept specifically described in this application, constitutes a separate and distinct invention that is independent of the structural and functional features of the exemplary embodiments described herein and could be claimed separately.

For the rider's information, the control unit may also be connected to a display unit. The display unit, in turn, could generally be connected to the control unit by a wired connection, for example, and arranged anywhere on the means of transport, such as on the handlebar. However, it is preferred that the display unit is likewise located inside the drive unit housing, such that it is visible from the outside through a viewing window in the drive unit. Together with the viewing window, it is therefore preferably located on the side of the drive unit facing away from a road surface, i.e. on the top side of the drive unit. The viewing window is made of a transparent material, for example glass or a plastic. The display unit preferably comprises at least one display of an information about the operating state of the means of transport, for example the current travel speed or a battery charge level. The display is preferably luminous and comprises LEDs, for example. During operation of the means of transport, the rider can, for example, look down at the drive unit and read the corresponding information on the display unit. The display unit in conjunction with a viewing window can basically be implemented for any drive unit that includes electronics. Therefore, this aspect, in addition to embodiments of the concept specifically described in this application, constitutes a separate and distinct invention that is independent of the structural and functional features of the exemplary embodiments described herein and could be claimed separately.

As has already been explained, the control unit can control the rotational position of the crankshaft and thus of the pedals by controlling the electric drive motor. For example, when riding a bicycle, it is typical that at least one of the pedals must be placed in a position oriented forward and upward each time the bicycle stops. Looking sideways at the crankshaft such that a forward direction of travel corresponds to a clockwise rotation of the crankshaft and pedals, one of the pedals should therefore be moved to the 2 o'clock position, for example. In this start-up position of the pedal, the rider can start comfortably and accelerate quickly. This positioning, which conventionally has to be set by the rider by pedaling backwards, can also be adjusted by the control unit. Thus, it is preferred that the control unit brings the input shaft into a starting position by controlling the electric drive motor. This function is executed, for example, whenever the control unit detects a standstill of the means of transport. In this way, the means of transport is always automatically made ready to start without the rider having to take care of this. This positioning of a pedal into a starting position can generally be implemented with any drive system that can influence the position of the pedals. Therefore, this aspect, in addition to embodiments of the concept specifically described in this application, constitutes a separate and distinct invention that is independent of the structural and functional features of the exemplary embodiments described herein and could be claimed separately.

The present invention generally relates to all generic means of transport that can be simultaneously driven, at least temporarily, electromotively and by human muscular power. A particular focus and therefore a preferred embodiment provides that the means of transport is a single, double or triple track vehicle, in particular an electric bicycle, pedelec, e-bike, cargo bike or transport bike. The means of transport therefore has the typical structure of these aforementioned embodiment examples. For example, the means of locomotion comprises a frame, in particular with a top tube and/or down tube, and preferably a front wheel and a rear wheel. The front wheel is connected to the top tube and/or down tube via a head tube or fork tube. Seen in the longitudinal direction of the means of transport at the level of the pedaling axis, a seat tube is also arranged, which connects the top tube with the down tube and carries a saddle for the operator. Two seat stays extend further back from the seat tube and are connected to each other at the rear wheel axle. The rear wheel is mounted on the seat stays, thus forming the rear wheel axle at this point. In order to provide the electrical energy necessary for the operation of the electric drive motor, the means of transport preferably comprises an electrical energy storage device, for example a battery. The electrical energy storage device is preferably arranged in the top tube and/or down tube. In particular, the front wheel of the means of transport is steerable, for example by rotation of the head tube or fork tube through a rotation of a handlebar at its upper end performed by the operator. In addition, the means of transport preferably comprises pedals which are configured to rotate about the pedaling axis via crank arms and which, in particular, are connected to the input shaft in a co-rotating manner. As already described above, the drive unit may be arranged either as a center drive unit at the pedaling axis or as a hub drive unit on the wheel axle of the rear wheel.

BRIEF DESCRIPTION OF THE DRAWINGS

The invention will be explained in more detail below by reference to the embodiment examples shown in the figures. In the schematic figures:

FIG. 3: is an external view, in particular a top view, of the center drive unit;

FIG. 4: is an external view, in particular a top view, of the hub drive unit;

Like parts, or parts acting in a like manner, are designated by like reference numerals. Recurring parts are not designated separately in each figure.

DETAILED DESCRIPTION

Figure 1:
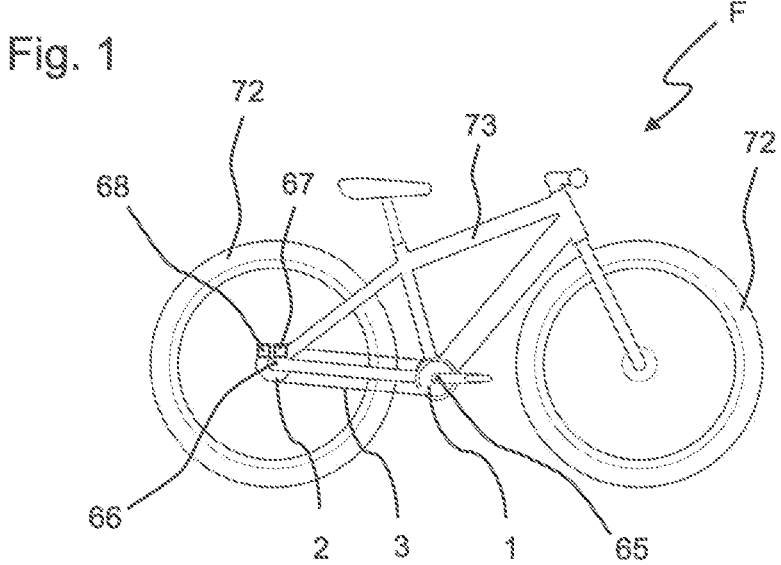
FIG. 1: is a side view of a means of transport with a center drive unit.
Figure 2:
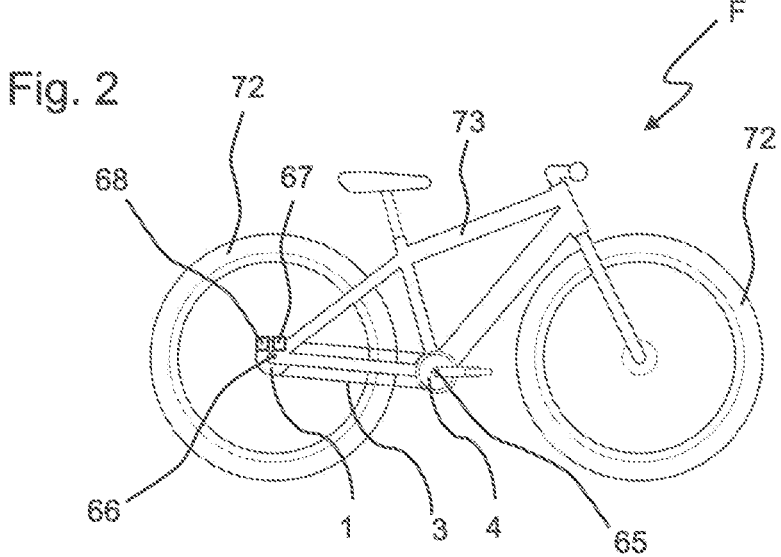
FIG. 2: is a side view of a means of transport with a hub drive unit

FIGS. 1 and 2 each show a means of transport F, more specifically a bicycle, in particular a pedelec. It can be driven simultaneously by electric motors and human muscle power, especially such that the drive from human muscular power is supported by an electric motor. In a known manner, the means of locomotion F comprises a frame 73 and two travel units 72, more specifically a front wheel and a rear wheel. The pedal axis 65 is located at the center and at the lower end of the frame 73. The wheel axle 66 is located at the connection point of the frame 73 with the rear wheel. FIG. 1 shows an embodiment in which the drive unit 1 is configured as a center drive unit and lies on the pedal axis 65. Human muscle power is applied directly to the drive unit 1 via the crankshaft. The transmission output of the drive unit 1 is configured as a traction means gearwheel 10 (see FIGS. 3 and 6) and is connected to the rear wheel hub 2 via a traction means 3, for example a chain. In the embodiment shown in FIG. 2, the drive unit 1 is configured as a hub drive unit and is arranged on the wheel axle 66. In this case, the transmission output of the drive unit 1 is configured as a hub housing, the rotational movement of which is transmitted to the rear wheel via the spokes 59 (see FIG. 4). Via the traction means 3, the drive unit 1 is connected to the bottom bracket 4, through which human muscle power is applied to the drive unit 1.

FIGS. 3 and 4 each show a top view of the drive unit 1 from the outside. FIG. 3 shows the drive unit 1 as a center drive unit. The rotation axis 9 of the drive unit 1 lies on the pedaling axis 65 about which the crank arms 5 and the pedals 6 of the means of transport F rotate during a pedaling motion by an operator. The traction means gearwheel 10 serves to transmit the rotational movement to the rear wheel hub 2. The width of the drive unit 1 is designated with B1. The distance between the crank arms 5 is designated with B2. To allow comfortable pedaling with the pedals 6 which is adapted to the human anatomy, the distance B2 of the crank arms 5 should be between 140 and 180 mm. The width B1 of the drive unit 1 must therefore be correspondingly smaller. In addition, FIG. 3 shows the control unit 42, which is integrated into the drive unit 1. The control unit 42 is connected to a plurality of sensors to detect the operating state of the drive unit 1 and the means of transport F, as will be explained in more detail below. Moreover, the control unit 42 is connected to a display unit 70, for example a luminous display, which can be viewed from outside the drive unit 1. For example, the display unit 70 is arranged behind a viewing window in the outer housing of the drive unit 1. The display unit 70 can therefore be viewed by an operator seated on the means of locomotion F by glancing downward. FIG. 4 shows an embodiment in which the drive unit 1 is configured as a hub drive unit. The rotation axis 9 of the drive unit 1 is therefore located on the wheel axis 66 about which the rear wheel rotates when the means of transport F is in motion. A rotation originating from the pedals 6 is transmitted to the drive unit 1 via the traction means gearwheel 10. While the drive unit 1 as a center drive unit is passed through by a rotating crankshaft 32 (see FIG.

6), as a hub drive unit it is passed through by a stationary axle body 11 around which the rear wheel rotates. A part of the hub housing that rotates around the axle body 11 and is connected to the spokes 59 in a co-rotating manner serves as the transmission output and thus as the output shaft 12. The spokes 59 in turn transmit the rotational movement to the rest of the rear wheel.

Figure 5:
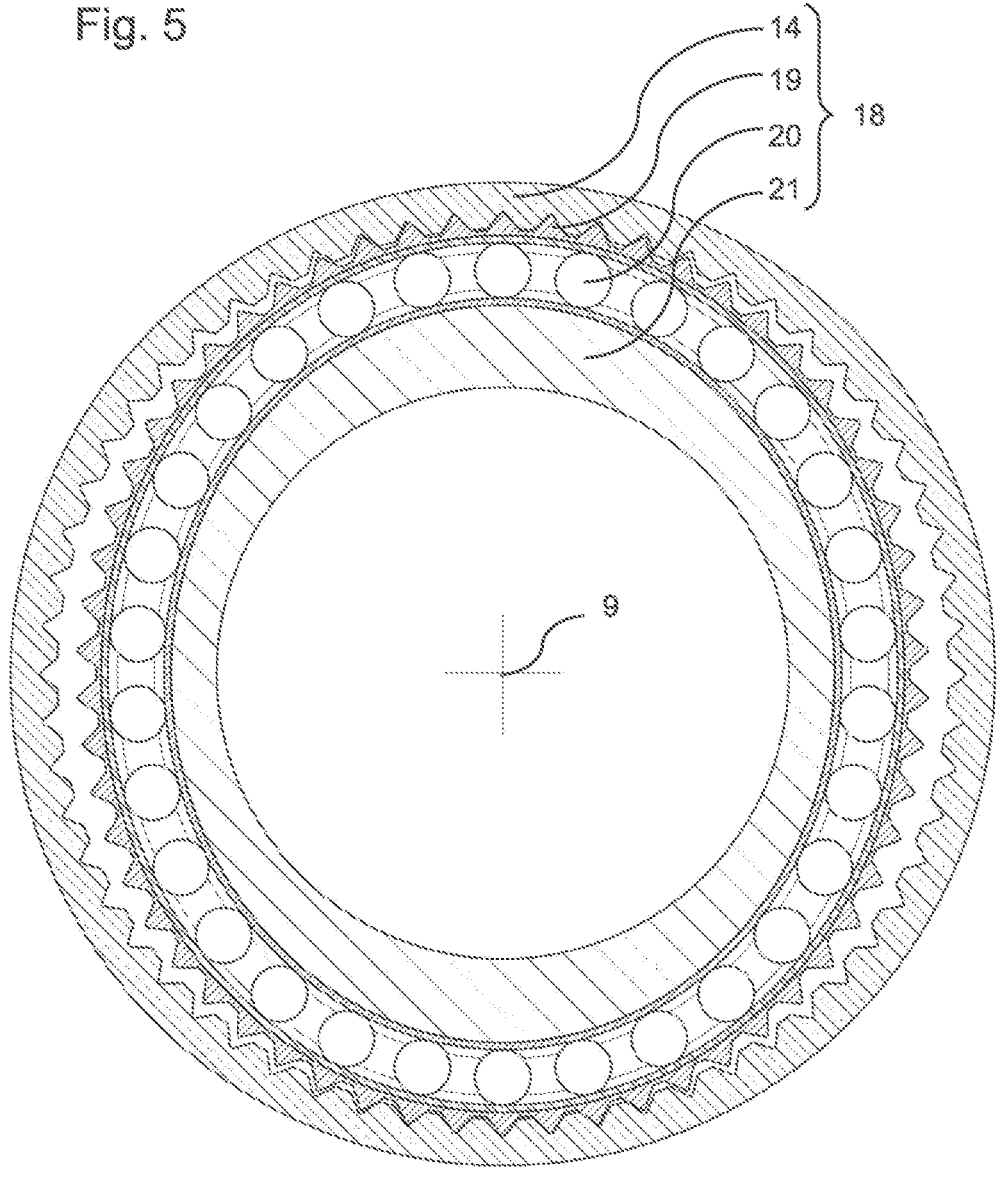
FIG. 5: shows a cross-section through a harmonic transmission.

FIG. 5 shows a cross-section through a harmonic gearing, more specifically the harmonic drive transmission 18, as used in the invention. The harmonic drive gearing 18 is arranged around the rotation axis 9 and comprises a wave generator 20, a rotary bearing 21, in particular a (grooved) ball bearing, a flexspline 19 and a ring gear 14. The ring gear 14 and the wave generator 20 are configured as rigid components, while the flexspline 19 is flexible or elastic. The wave generator 20 is oval and the flexspline 19 is mounted on the wave generator 20 via the rotary bearing 21 such that the flexspline 19 adapts to the oval shape of the wave generator 20 due to its elasticity. The ring gear 14 has an internal toothing and the flexspline 19 has a complementary external toothing, with the flexspline 19 typically having fewer teeth than the ring gear 14. Due to the oval shape of the wave generator 20, the external toothing of the flexspline 19 is pressed into the internal toothing of the ring gear 14 along the major axis of the wave generator 20. At the same time, the elastic deformation of the flexspline 19 causes its external toothing along the minor axis of the wave generator 20 to disengage from the internal toothing of the ring gear 14. When the wave generator 20 rotates, the flexspline 19 rotates in the opposite direction of rotation with a reduction ratio of $i=z_H/(z_H-z_F)$, where $z_H$ is the number of teeth of the ring gear 14 and $z_F$ is the number of teeth of the flexspline 19. When the flexspline 19 is retained, the ring gear 14 rotates at the corresponding reduced speed in the same direction as the wave generator 20. Such harmonic transmissions 18 are summation-type transmissions and are known in the prior art, and are therefore not explained in more detail here.

Figure 6:
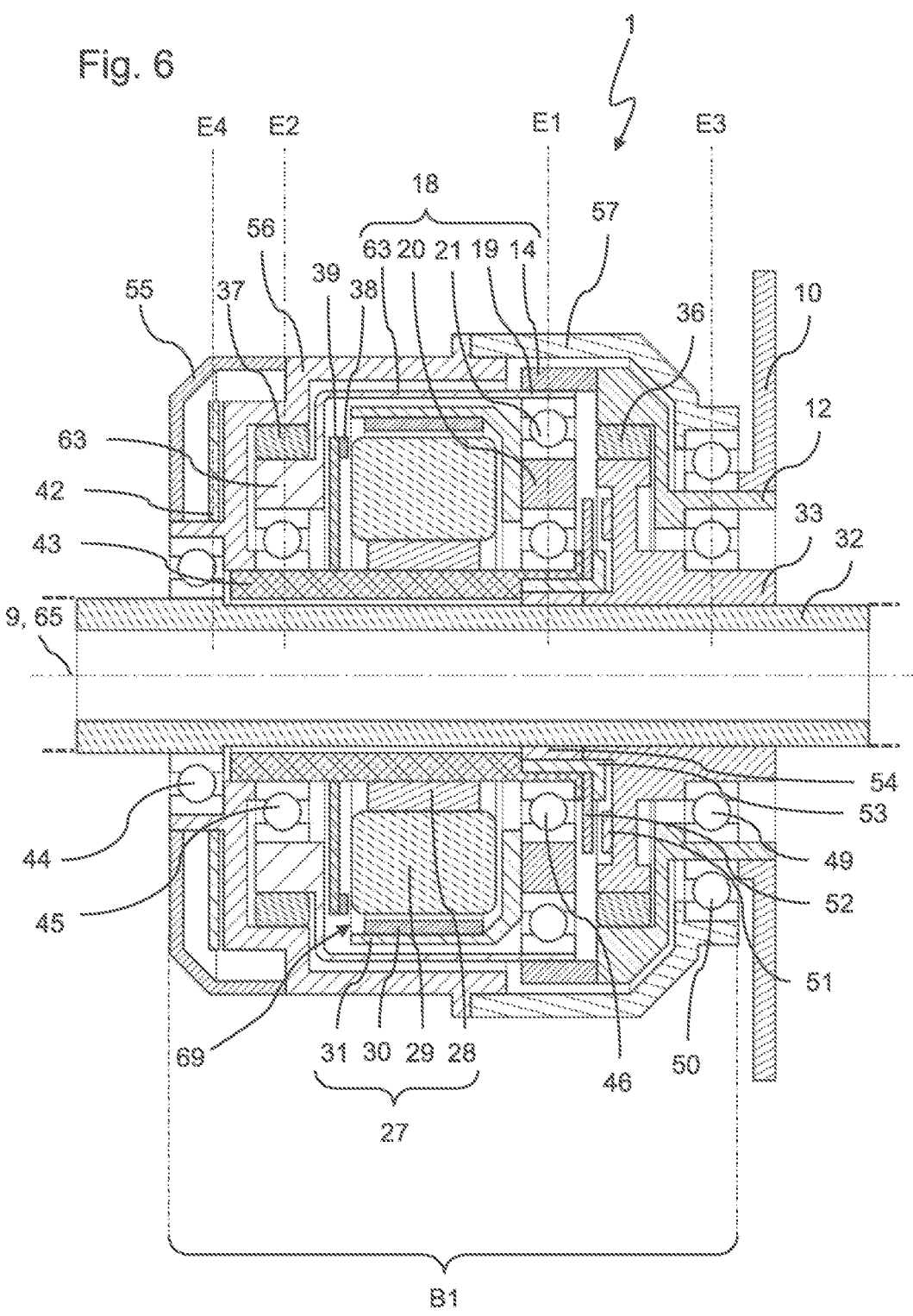
FIG. 6: is a cross-sectional view along the rotation axis through a drive unit configured as a center drive unit.

FIG. 6 shows a cross-section through the drive unit 1 configured as a center drive unit along the rotation axis 9 or the pedaling axis 65. The pedaling axis 65 is defined by the crankshaft 32, which is drivable by an operator via the pedals 6 and which passes through the drive unit 1 along the rotation axis 9. The crankshaft 32 is in co-rotating connection with the input shaft 33, through which the drive energy applied by the operator is introduced into the transmission of the drive unit 1. The transmission output is formed by the output shaft 12, which is connected to the traction means gearwheel 10, in this case the chainring, in a co-rotating manner. The drive unit 1 has two sources of drive energy or drive power: Firstly human muscle power via the input shaft 33 and secondly the electric drive motor 27. The electric drive motor 27 is integrated into the drive train of the drive unit 1 via the harmonic drive transmission 18.

When an operator rotates the crankshaft 32 by pedaling with the pedals 6, he thereby rotates the input shaft 33. The input shaft 33 is connected to the output shaft 12 via a freewheel 36. The freewheel 36 is configured such that it engages when the input shaft 33 rotates in the forward direction of travel and establishes a co-rotating connection between the input shaft 33 and the output shaft 12. During a rotation in reverse direction, on the other hand, the freewheel 36 rotates freely. Through the connection between the input shaft 33 and the output shaft 12, the drive energy introduced by the operator through pedaling with the pedals 6 is transmitted to the output shaft 12, and thus to the traction means gearwheel 10, at a one-to-one ratio. Furthermore, the output shaft 12 is connected to the ring gear 14 in a co-rotating manner.

The electric drive motor 27 comprises a stator 28 with stator windings 29 and a rotor 31 with permanent magnets 30. The stator 28 is arranged on a stationary counter bearing 43. The rotor 31 of the electric drive motor 27 is connected to the wave generator 20 of the harmonic drive transmission 18 in a co-rotating manner, in particular integrally. Therefore, the electric drive motor 27 drives the wave generator 20 of the harmonic drive gearing 18. The rotation of the wave generator 20 transmits the drive energy of the electric drive motor 27 to the flexspline 19. The flexspline 19 is supported on a stationary housing part 56 via a freewheel 37. The drive energy is transmitted to the ring gear 14 of the harmonic drive transmission 18 via the flexspline 19. The ring gear 14 of the harmonic drive gearing 18 is connected to the output shaft 12 in a co-rotating manner. In the ring gear 14 or the output shaft 12, the drive energy or drive power of the electric drive motor 27 and the human muscle power introduced via the crankshaft 32 are summed and transmitted to the traction means gearwheel 10. The electric drive motor 27 is configured to be operable to supply the main part of the drive energy or drive power for traveling operation of the means of transport F. To drive the ring gear 14 in the forward direction of travel, the wave generator 20 must likewise be rotated in the forward direction of travel. This results in an opposite direction of rotation of the flexspline 19, i.e., in the reverse direction. Therefore, in order for the drive energy to be transmitted from the wave generator 20 to the ring gear 14, the flexspline 19 must be supported in the reverse direction against a stationary housing part. Thus, the freewheel 37 is configured to establish a co-rotating connection between the flexspline 19 and the stationary housing part 56 when the flexspline 19 is rotated in reverse direction. A reverse rotation of the flexspline 19 is thereby prevented, so that all of the drive energy applied to the wave generator 20 by the electric drive motor 27 is transferred to the ring gear 14 and is available to drive the means of transport F.

If, on the other hand, the electric drive motor 27 is not operated or is operated only more slowly than the ring gear 14 is rotated, for example, by the operator through human muscle power, the output shaft 12 rotates the ring gear 14 and, through its meshing with the flexspline 19, also rotates the flexspline 19 in the forward direction of travel. However, in the direction of rotation of the flexspline 19 corresponding to the forward direction of travel, the freewheel 37 allows free rotation, whereby, in interaction with the rotary bearing 21 between the flexspline 19 and the wave generator 20, no drive energy is transmitted to the wave generator 20 and thus to the rotor 31 of the electric drive motor 27. Therefore, the electric drive motor 27 does not have to be dragged along by the rider when pedaling by pure muscle power, allowing for easy, comfortable pedaling with the pedals 6.

According to a preferred embodiment of the invention, the freewheel 37 is configured as a switchable freewheel 37. This means that it can be controlled by the control unit 42 such that it establishes a co-rotating connection between the flexspline 19 and the stationary housing part 56 in both directions of rotation. Alternatively, this co-rotating connection can be achieved by a separate clutch unit not shown. If the flexspline 19 is blocked in this manner also in a forward direction of rotation, drive energy is transmitted from the ring gear 14 to the wave generator 20 and thus to the rotor 31 of the electric drive motor 27. It is therefore then possible to operate the electric drive motor 27 as a generator, converting rotational energy from the ring gear 14 into electrical energy that can be fed into a battery, for example. By operating the electric drive motor 27 as a generator, the means of transport F is decelerated, so that this operation mode can also be used as a brake.

The present invention is characterized by a particularly narrow structure along the rotation axis 9. For this purpose, the drive unit 1 comprises a number of structural features, which are discussed below. Firstly, the invention utilizes a harmonic gearing, more specifically the harmonic drive transmission 18, in which the ring gear 14 is used as the gearing output. Due to this configuration, only a small amount of installation space is required in an axial direction of the rotation axis 9.

In addition, the flexspline 19 of the harmonic drive transmission 18 is configured with a sleeve 63. The sleeve 64 is a cylindrical extension of the flexspline 19 from its region of engagement with the ring gear 14 in the axial direction of the rotation axis 9. The sleeve 63 is located in the center of the drive unit 1 as seen axially along the rotation axis 9. At its axial end opposite the region of engagement with the ring gear 14, the sleeve 63 is mounted on a stationary housing part, for example the counter bearing 43, via a rotary bearing 45. The flexspline 19 extends, in other words, as seen in the axial direction of the rotation axis 9, from a gearing plane E1 arranged perpendicular to the rotation axis 9, in which the components of the harmonic drive transmission 18, wave generator 20, rotary bearing 21, flexspline 19 and ring gear 14 overlap in radial direction of the rotation axis 9, to a bearing plane E2, in which the flexspline 19 overlaps with the rotary bearing 45 in radial direction of the rotation axis 9. The flexspline 19 has a sleeve cavity 69 inside its hollow-cylindrical body. In order not to leave any installation space unused here, in the embodiment examples of the invention shown, the electric drive motor 27 is arranged in the sleeve cavity 69 of the flexspline 19 of the harmonic drive transmission 18. In particular, the electric drive motor 27 is arranged over the entire axial extent of its stator 28 with the stator windings 29 as well as the rotor 31 with the permanent magnets 30 inside the flexspline 19, in particular in the sleeve cavity 69. Furthermore, the electric drive motor 27 is arranged between the gearing plane E1 and the bearing plane E2.

Another key idea of the present invention is to make the drive unit 1 particularly narrow in the axial direction of the rotation axis 9 by arranging various rotary bearings at a same height as other components in the axial direction of the rotation axis 9. The individual components of the drive unit 1 are therefore nested within each other as seen in the axial direction of the rotation axis 9, as are the electric motor 27 and the harmonic drive transmission 18 due to the arrangement in the sleeve cavity 69. For example, it is envisaged that the rotary bearing 46, for example a ball bearing, for the rotor 31 of the electric drive motor 27 is arranged opposite a stationary counter bearing 43 together with the harmonic drive transmission 18 in the gearing plane E1. For example, the rotary bearing 46 overlaps the other components of the harmonic drive gearing 18, such as the wave generator 20, the rotary bearing 21, the flexspline 19, and the ring gear 14, over its entire axial extent in the direction of the rotation axis 9. In this way, the rotary bearing 46 does not need to be formed in axial succession with these components of the harmonic drive transmission 18, which reduces the overall extent of the drive unit 1.

Another implementation of this key idea can be found in the bearing plane E2. In the bearing plane E2 of the flexspline 19, viewed in radial direction of the rotation axis

9, there is an overlap between the rotary bearing 45, via which the flexspline 19 is mounted on the stationary counter bearing 43, and the freewheel 37 between the flexspline 19 and the stationary housing part 56. This also reduces the overall axial extent of the drive unit 1.

The rotary bearings 49 and 50, both also preferably ball bearings, are also arranged in a common shaft bearing plane E3 perpendicular to the rotation axis 9. The rotary bearing 49 is arranged between the input shaft 33 and the output shaft 12, and supports them rotatably relative to each other. The rotary bearing 50 is arranged between the output shaft 12 and a stationary housing part 57. The rotary bearings 49, 50 are of identical configuration (except for the necessary difference in diameter), lie concentrically around the rotation axis 9 and, viewed in radial direction of the rotation axis 9, overlap in particular completely.

A further rotary bearing 44 between the crankshaft 32 and a stationary housing part 56 is located in a further electronics bearing plane E4 arranged perpendicular to the rotation axis 9, in which the rotary bearing 44 at least partially overlaps with the control unit 42 in radial direction of the rotation axis 9. This means that the control unit 42 is not merely attached to the outside of the drive unit 1, but is nested with gearing elements of the drive unit 1, which again saves axial extent. To the outside, the control unit 42 is covered by a housing cover 55.

The control unit 42 is configured to control the electric drive motor 27. In order to be able to perform the respective control functions, the control unit 42 requires various measured values regarding the current operating state of the drive unit 1 and the means of transport F. For example, the control unit 42 is connected to the suspension travel sensor 67 and the travel speed sensor 68 shown in FIGS. 1 and 2, both of which are arranged on the rear wheel. In addition, the control unit 42 is connected to an amperemeter 71, via which the control unit 42 measures the amperage in the electric drive motor 27. In addition, the control unit 42 is connected to a Hall sensor 38 at the electric drive motor 27 via a printed circuit board 39. Both the circuit board 39 and the Hall sensor 38 are also arranged in the sleeve cavity 69 together with the electric drive motor 27. This sensor 38 can be used to determine the speed and rotation angle position of the electric drive motor 27. Another sensor unit 51, 52 connected to the control unit 42 has a stationary part 52 at the stationary housing, for example the counter bearing 43, and a part 51 rotating with the input shaft 33. The sensor unit 51, 52 determines, for example, the torque applied by human muscle power to the crankshaft 32 and thus the input shaft 33, as well as the rotation angle position. The speed of the crankshaft 32 and thus of the input shaft 33 can likewise be determined via the time derivative of the rotation angle position. The stationary part 52 of the sensor unit 51, 52 is fastened to the counter bearing 43, in particular by means of a fastening nut 53, in particular in a region in which the counter bearing 43 is mounted relative to the crankshaft 32 via a rotary bearing 54, in particular a needle bearing.

The embodiment example of the drive unit 1 shown in FIG. 6 is configured as a center drive unit and is therefore arranged at the pedaling axis 65. However, the means of transport F according to the invention may also be configured with a drive unit 1 configured as a hub drive unit. Such a drive unit 1 is then configured such that its rotation axis 9 is coaxial with the wheel axis 66, in particular of the rear wheel. This configuration of the drive unit 1 is for the most part similar to the drive unit 1 configured as a center drive unit. Therefore, only the differences will be briefly discussed. In particular, when the drive unit 1 is configured as a hub drive unit, there is no crankshaft 32 passing through the drive unit 1. Instead, the drive unit 1 is passed through by a stationary, static axle body 11, which comprises, for example, the counter bearing 43 as well as various stationary housing parts 56. The input shaft 33 is not moved directly by the pedals 6 or the crankshaft 32, but the pedal movement is transmitted to the input shaft 33 via the traction means 3 and the traction means gearwheel 10. Further, the output shaft 12 is not connected to the traction means gearwheel 10, but is formed by a rotating hub housing connected to the ring gear 14 in a co-rotating manner. The spokes 59 of the rear wheel are arranged on the hub housing. Moreover, a brake disc is also typically arranged on the hub housing. Otherwise, the embodiment of the drive unit 1 as a hub drive unit corresponds to that as a center drive unit, and thus reference is made to the above discussion to avoid repetition.

All in all, the invention makes it possible to provide a particularly compact drive unit 1 in terms of its axial extent along the rotation axis 9. In addition, the drive unit 1 according to the invention can be used to represent a plurality of control functions desired in modern means of transport F, such as pedelecs.

What is claimed is:

1. A means of transport that can be simultaneously driven electromotively and by human muscular power, with a drive unit, the drive unit comprising:

an input shaft for transmitting drive energy generated from human muscular power;

an output shaft for delivering drive energy to a travel unit;

a harmonic drive transmission arranged around a rotation axis and having a wave generator, a flexspline and a ring gear;

an electric drive motor arranged around the rotation axis and having a stator and a rotor, wherein drive energy of the electric drive motor is transmittable to the output shaft via the harmonic drive transmission, wherein the flexspline is configured as a sleeve extending in an axial direction of the rotation axis, which is connected on one axial side to a rotary bearing and toward another axial side has an engagement region for the wave generator, wherein a sleeve cavity is provided between the rotary bearing and the wave generator, as seen in the axial direction of the rotation axis, and wherein the electric drive motor is arranged in the axial direction of the rotation axis at least partially in the sleeve cavity of the flexspline of the harmonic drive transmission with respect to an axial extent of the stator along the rotation axis.

2. The means of transport according to claim 1, wherein the wave generator, the flexspline and the ring gear of the harmonic drive transmission are arranged overlapping one another in a gearing plane perpendicular to the rotation axis, and the flexspline is mounted rotatably with respect to a counter bearing in a bearing plane perpendicular to the rotation axis, wherein the electric drive motor is arranged between the gearing plane and the bearing plane.

3. The means of transport according to claim 1, wherein a speed and/or rotation angle sensor is provided at the electric drive motor.

4. The means of transport according to claim 1, wherein a rotary bearing for the output shaft and a rotary bearing for the input shaft are arranged in a common shaft bearing plane perpendicular to the rotation axis.

5. The means of transport according to claim 1, wherein the electric drive motor and the harmonic drive transmission are arranged coaxially to one other around the rotation axis.

6. The means of transport according to claim 1, wherein the input shaft is connected to the output shaft in a co-rotating manner at least in one direction of rotation, and the energy provided through human muscular power is transmitted to the output shaft.

7. The means of transport according to claim 1, wherein the flexspline of the harmonic drive transmission is mounted on a stationary housing part via a freewheel.

8. The means of transport according to claim 7, wherein the freewheel is switchable or the flexspline and the stationary housing part are connectable in a co-rotating manner by a separate clutch unit, such that the electric drive motor is operable as a generator which receives drive energy from the ring gear and converts the drive energy into electrical energy.

9. The means of transport according to claim 7, wherein a rotary bearing is arranged between a counter bearing and the flexspline of the harmonic drive transmission in a bearing plane perpendicular to the rotation axis such that the rotary bearing overlaps with a freewheel.

10. The means of transport according to claim 1, wherein the wave generator, the flexspline and the ring gear of the harmonic drive transmission are arranged in a gearing plane perpendicular to the rotation axis together with a rotary bearing for the rotor of the electric drive motor.

11. The means of transport according to claim 1, wherein in the axial direction along the rotation axis, a shaft bearing plane, a gearing plane of the harmonic drive transmission, and a bearing plane of the flexspline of the harmonic drive transmission are arranged in succession.

12. The means of transport according to claim 1, wherein the drive unit is configured as a center drive unit or the drive unit is configured as a hub drive unit.

13. The means of transport according to claim 1, wherein a maximum extent of the drive unit along the rotation axis is not more than 100 mm.

14. The means of transport according to claim 1, wherein a control unit for controlling the electric drive motor is provided, which comprises at least one of the following features:

the control unit is arranged together with a rotary bearing for a crankshaft in an electronics bearing plane perpendicular to the rotation axis;

the control unit is connected to a rotation angle and/or speed and/or torque sensor at the input shaft;

the control unit is connected to a travel speed sensor;

the control unit is connected to a speed and/or rotation angle sensor at the electric drive motor;

the control unit is connected to an amperemeter for the electric drive motor;

the control unit controls the speeds and torques of the electric drive motor such that the drive energy, including the energy obtained from human muscular power, at the output shaft corresponds to the energy requirement of the drive unit;

the control unit controls the speed of the electric drive motor in proportion to the travel speed;

the control unit activates a drive support function or a brake function depending on the direction of rotation of a shaft driven by human muscular power;

the control unit is connected to a suspension travel sensor of the means of transport and at least partially compensates a pedal kickback caused by compression of a suspension of the means of transport by controlling the electric drive motor;

the control unit is connected to a display unit which is visible from the outside through a viewing window in the drive unit;

the control unit brings the input shaft into a starting position by controlling the electric drive motor.

15. The means of transport according to claim 1, comprising at least one of the following features:

the means of transport is an electric bicycle, pedelec, e-bike, cargo bike or transport bike;

the means of transport comprises a frame;

the means of transport comprises an electrical energy storage device;

the means of transport comprises a front wheel and a rear wheel;

the front wheel is steerable;

the means of transport comprises pedals which are rotatable about a pedaling axis via crank arms.

16. The means of transport according to claim 1, wherein the means of transport is a pedelec.

* * * * *